United States Patent [19]

Minoshima

[11] Patent Number: 5,457,989
[45] Date of Patent: Oct. 17, 1995

[54] AIR FLOW SURVEYING APPARATUS AND METHOD

[75] Inventor: Masahiko Minoshima, Tokyo, Japan

[73] Assignee: NEC Corporation, Tokyo, Japan

[21] Appl. No.: 267,017

[22] Filed: Jun. 21, 1994

[30] Foreign Application Priority Data

Jul. 21, 1993 [JP] Japan ................................. 5-179650

[51] Int. Cl.⁶ ................................................. G01N 15/00
[52] U.S. Cl. .................................... 73/170.06; 73/170.04
[58] Field of Search ......................... 73/170.01, 170.04, 73/170.06; 356/28, 28.5; 364/420, 423

[56] References Cited

U.S. PATENT DOCUMENTS

| | | | |
|---|---|---|---|
| 3,182,499 | 5/1965 | Moses | 73/170.04 |
| 3,446,558 | 5/1969 | Seaton | 356/28.5 |
| 3,448,613 | 6/1969 | Kastner et al. | 73/170.04 |
| 3,537,306 | 11/1970 | Bedinger | 73/170.04 |
| 3,825,346 | 7/1974 | Rizzo | 356/28.5 |

FOREIGN PATENT DOCUMENTS 57-86058  5/1982  Japan.

*Primary Examiner*—Richard E. Chilcot, Jr.
*Assistant Examiner*—Ronald L. Biegel
*Attorney, Agent, or Firm*—Foley & Lardner

[57] ABSTRACT

A method for measuring a direction of a laminar air flow uses a particle stream tracing an air flow and having a grain size substantially uniform along the particle stream. The direction of the particle stream is detected by a first and a second rectangular laser beams crossing each other in the vicinity of the particle stream at right angles and rotatable around an axis passing through the cross point of the laser beams. The second laser beam is further rotatable around the axis thereof. When the particle stream crosses the laser beams along the longer sides of the rectangular radiant area of the laser beam, the amount of a scattered light generated from the laser beam is large. Hence, the direction of the particle stream is detected by the rotational angle of the second laser beam. The direction of an air flow can be measured with a good accuracy because the measurement does not disturb the original air flow.

8 Claims, 7 Drawing Sheets

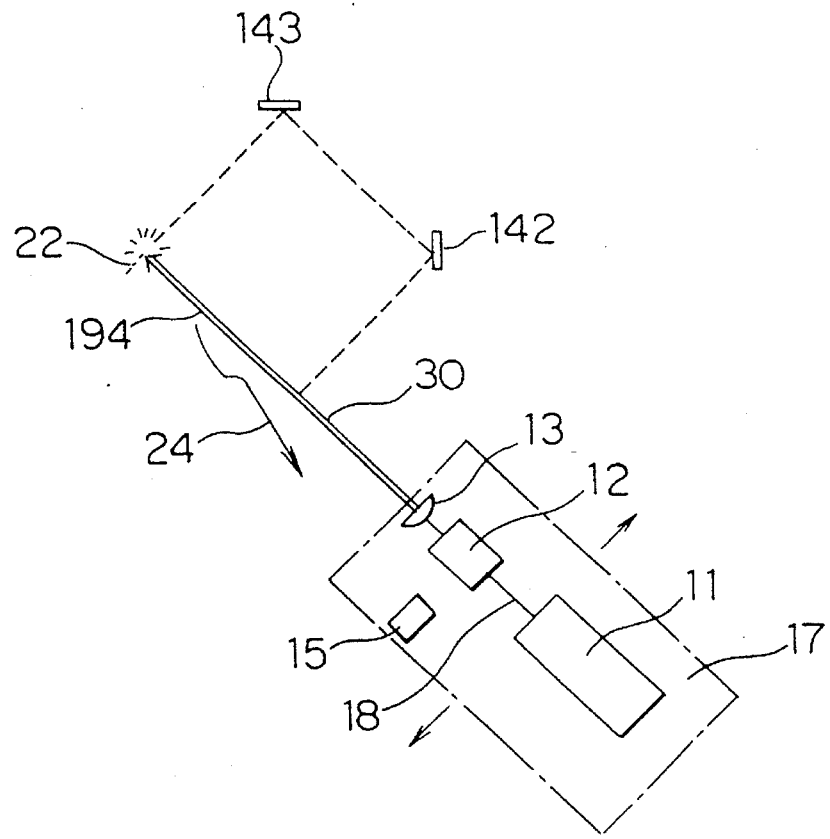
F I G. 5A
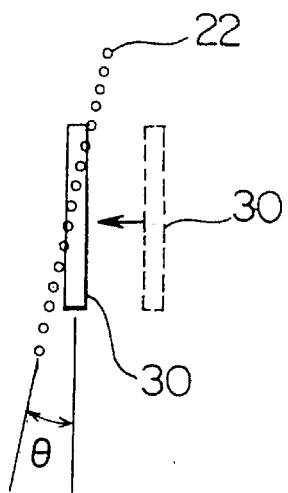
F I G. 5B 5,457,989

AIR FLOW SURVEYING APPARATUS AND METHOD

BACKGROUND OF THE INVENTION (a) Field of the Invention

The present invention relates to an apparatus and a method for surveying an air flow and, more particularly, to an apparatus and a method used for measuring a direction of a laminar air flow.

(b) Description of the Related Art

Performance tests after completion of building a clean room for fabricating a semiconductor device includes an examination in which an air flow in the clean room is surveyed especially in a region of a laminar air flow. Such a survey includes a vertical test of a laminar air flow in which an angle deviation of the direction of the air flow is examined from a vertical direction. When measuring the direction of an air flow in a clean room, it is important not to disturb the original air flow.

FIG. 1 shows a typical clean room in which a vertical laminar air flow is surveyed by conventional methods. An air flow passing HEPA filters 45 is directed downward in the clean room toward an access floor 46 and passes therethrough. As shown in FIG. 1, conventional methods for measuring an angle deviation of the air flow from a vertical direction includes one in which an angle deviation of a silk string 42 hanging from the ceiling 41 in the air flow or a mist stream 44 generated from pure water by a mist generator 43 and discharged downward in the air flow is surveyed or measured with the eye. In such a conventional method, however, the air flow can be surveyed merely in a qualitative characteristic. Especially with the survey using a silk string 42, the mass of the silk string 42 itself cannot be neglected for obtaining a correct test result.

Other conventional methods for measuring a direction of a laminar air flow include one using a heat sensor acting as an air flow sensor. However, an air flow sensor which measures directly a laminar air flow having a very low velocity of, for example, 0.5 m/sec disturbs the original air flow, so that an accurate angle representing the direction of the air flow is not obtained in surveying a laminar air flow.

SUMMARY OF THE INVENTION

In view of the foregoing, an object of the present invention is to provide a new apparatus and a new method for measuring a vertical laminar air flow suitable for use in measurement of a direction of an air flow in a clean room.

A method for measuring a direction of an air flow according to a first aspect of the present invention includes steps of: generating a particle stream having a substantially uniform grain size along the particle stream for tracing an air flow; irradiating the particle stream by a light; detecting the direction of the particle stream by using scattering of the light effected by the particle stream.

A method for measuring a direction of an air flow according to a second aspect of the present invention includes steps of: discharging particles in an air flow to generate a particle stream having a grain size substantially uniform along the particle stream; irradiating the particle stream in a first direction by a first light having a first rectangular radiant area; rotating the first light in a first plane parallel to the first direction while irradiating the particle stream by the first light; stopping the rotating and the irradiating when an amount of the first light scattered by the particle stream is at a maximum during the rotation of the first light; radiating a second light having a second rectangular radiant area in a direction parallel to the first plane and substantially normal to the first light after the stopping of the rotation thereof; moving the second light in a direction parallel to the first plane and substantially normal to the second light, stopping the moving of the second light when an amount of the second light scattered by the particle stream is at a maximum during the moving of the second light; rotating the second light around the axis thereof and stopping the rotating of the second light when an amount of the second light scattered by the particle stream is at a maximum during the rotating of the second light; and measuring a rotation angle effected by the rotating of the second light.

An apparatus for measuring a direction of an air flow according to a third aspect of the present invention comprises: means for generating a particle stream tracing an air flow and having a grain size substantially uniform along the particle stream; means for radiating a rectangular light having a rectangular radiant area; first guide means for guiding the rectangular light to irradiate the particle stream in a first direction; a second guide means for guiding the rectangular light to irradiate the particle stream in a second direction normal to the first direction; means for rotating the rectangular light around the axis thereof; means for selecting one of the first and the second guide means to irradiate the particle stream; and means for measuring an amount of a scattered light generated from the rectangular light when the rectangular light guided by either of the first and the second guide means is scattered by the particle stream.

An apparatus for measuring a direction of an air flow according to a fourth aspect of the present invention comprises: means for generating a particle stream tracing an air flow and having a grain size substantially uniform along the particle stream; means for radiating a first light irradiating the particle stream in a first direction; means for radiating a second light rotatable around the axis thereof and irradiating the particle stream in a second direction normal to the first direction; and means for measuring an amount of a scattered light generated from either of the first and the second lights when the first or the second light is scattered by the particle stream.

In accordance with the present invention, a direction of a laminar air flow can be measured quantitatively with a good accuracy without disturbing the original air flow.

BRIEF DESCRIPTION OF THE DRAWINGS

The above and other objects, features and advantages of the present invention will be more apparent from the following detailed description, referring to the accompanying drawings in which:

FIG. 5A is a still another explanatory plan view for showing the apparatus of FIG. 2 at a third operational stage thereof;

FIG. 5B is still another elevational view showing schematically the particle stream and the rectangular light at the third operational stage;

DESCRIPTION OF THE PREFERRED EMBODIMENTS

The present invention will now be described in more detail with reference to the drawings.

Figure 2:
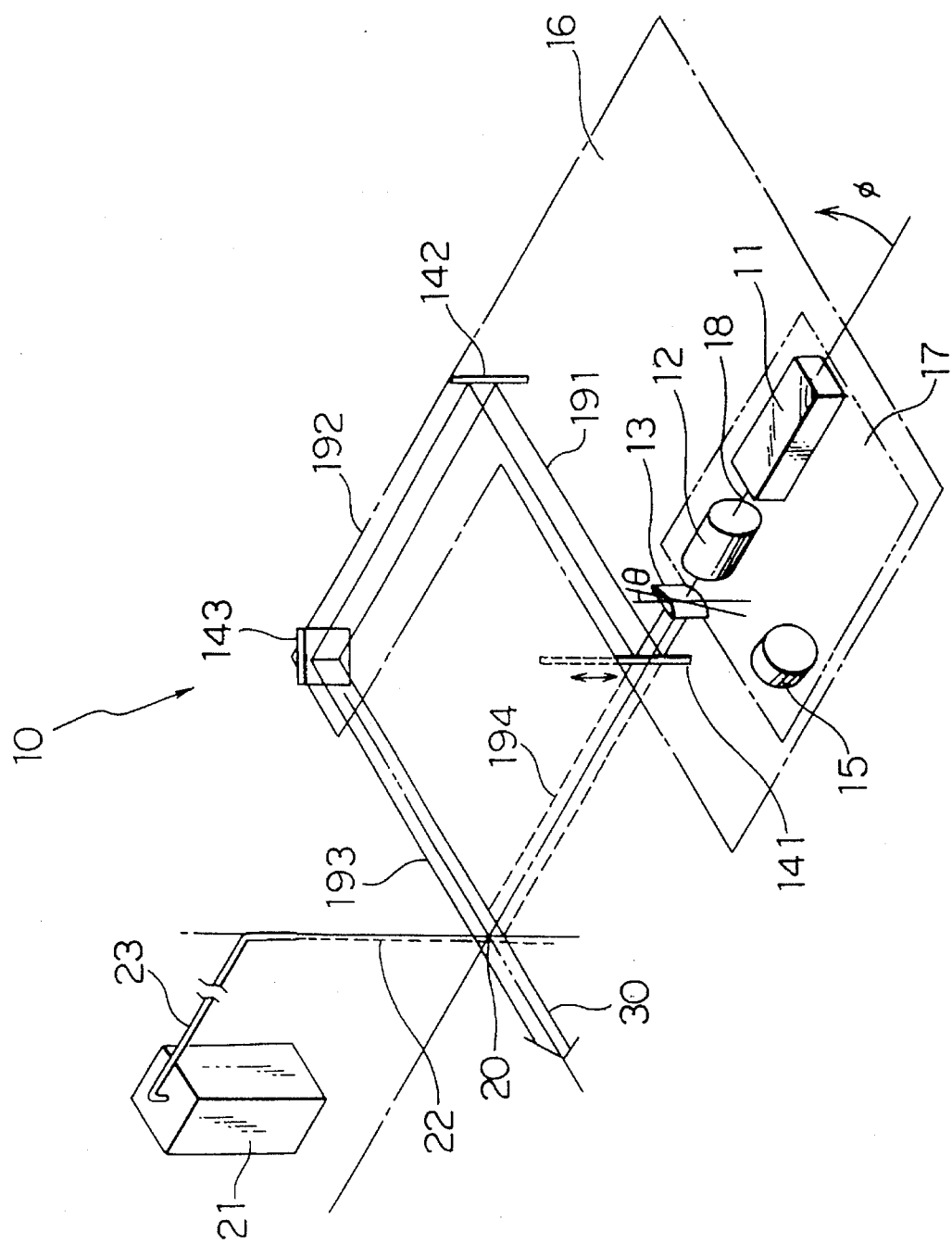
FIG. 2 is a schematic perspective view showing an apparatus for measuring a direction of an air flow according to a first embodiment of the present invention.

Referring to FIG. 2A, there is shown an apparatus for measuring a direction of a laminar air flow according to the first embodiment of the present invention. The apparatus of FIG. 2 comprises a stream generator 21 for generating a particle stream 22 acting as a tracer for the laminar air flow, and an optical system generally designated at 10 and mounted on a platform 16. The optical system 10 includes a laser oscillator 11, a primary lens set 12, a cylindrical lens 13, three plane mirrors 141, 142 and 143, and a photodetector 15. The primary lens set 12 includes a collimator lens therein not shown in the drawing. The cylindrical lens 13 is disposed rotatably around the laser axis 18 of the laser beam emitted by the laser oscillator 11.

The platform 16 is rotatable parallel to a virtual plane and around an axis passing through a virtual cross point 20. The virtual cross point 20 and the virtual plane as used in this text will be defined later. The laser oscillator 11, primary lens set 12, cylindrical lens 13 and photodetector 15 are mounted on a slide table 17 which is disposed on the platform 16 slidably in a direction normal to the laser axis 18 and parallel to the virtual plane.

The laser beam emitted by the laser oscillator 11 is converted to a rectangular laser beam 30 by the primary lens set 12 and the cylindrical lens 13, the rectangular laser beam 30 having a rectangular radiant area as viewed in the direction of the axis thereof and having vertical sides much larger than horizontal sides thereof.

The first plane mirror 141 is slidably mounted to the platform 16 in the vertical direction, as shown by an arrow in the drawing. When the first plane mirror 141 is moved in a lower first position as depicted by solid lines, the laser beam 30 is reflected by the first plane mirror 141 by a right angle, and travels along a path 191 to the second plane mirror 142. The laser beam 30 is then reflected and guided by the second and third plane mirrors 142 and 143, traveling along paths 192 and 193. On the other hand, when the first plane mirror 141 is moved in a higher second position as depicted by broken lines, the laser beam 30 travels straight ahead along a path 194.

The center lines or axes of the path 193 and the path 194 cross each other at right angles at a point which is called in this text the virtual cross point 20. The axes of the paths 191, 192, 193 and 194 lie in a plane called the virtual plane in this text.

Stream generator 21 discharges particles at a constant rate for generating a particle stream 22 tracing an air flow in a clean room. The particle stream 22 is constituted by, for example, small latex particles having extremely small diameters and has a uniform grain size along the particle stream 22. The particle stream 22 is discharged through a tube 23 of the stream generator 21 downward in a vertical direction at a position which is located just over the virtual cross point 20, namely, upper than the location of the virtual cross point 20 with respect to the laminar air flow.

Figure 1:
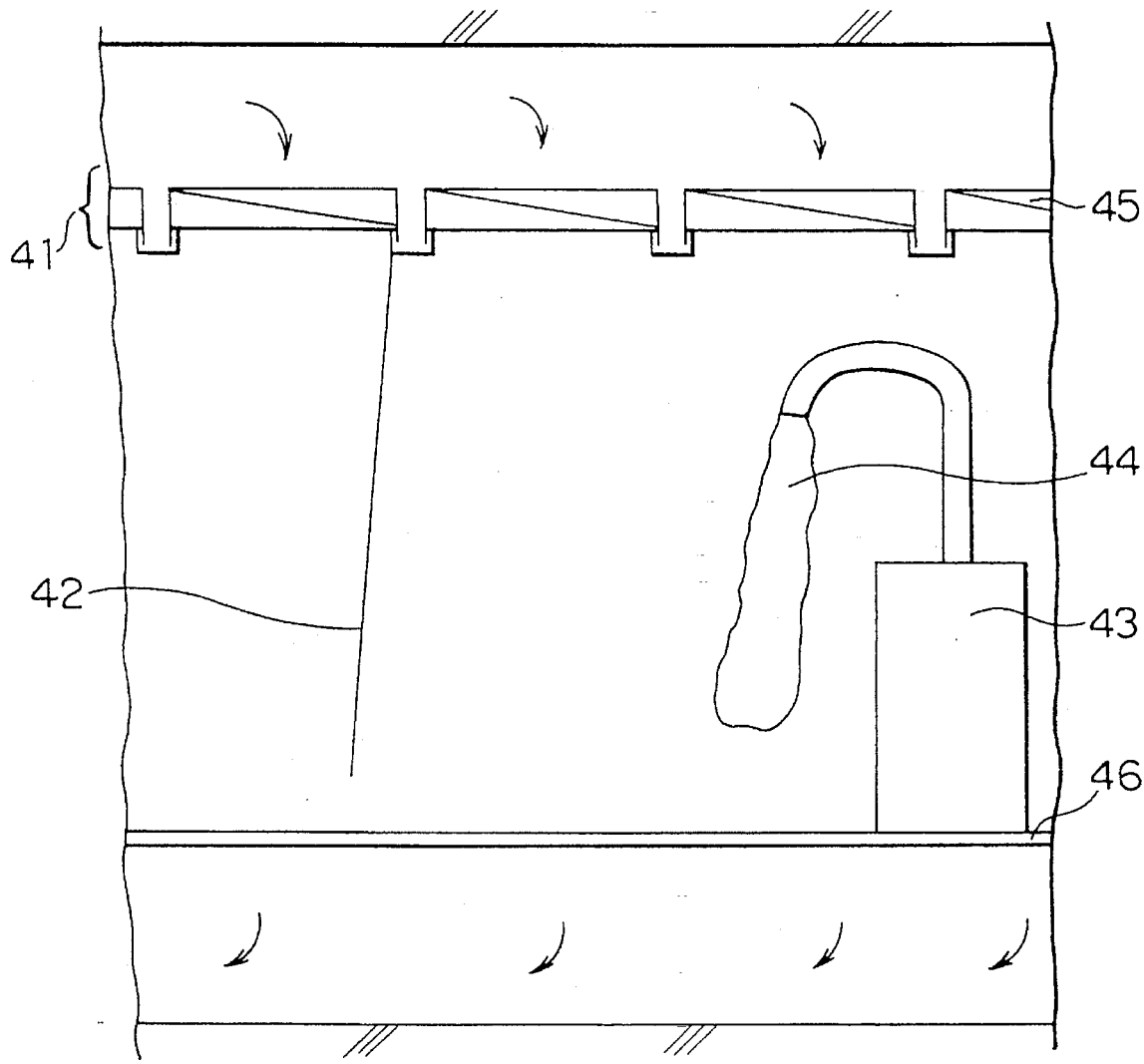
FIG. 1 is a elevational view of a clean room showing conventional methods for measuring a direction of a laminar air flow.

In operation, the apparatus of FIG. 2 is disposed in a laminar air flow such as shown in FIG. 1. In this text, it is assumed hereinafter that the laminar air flow runs downward in a direction of an inclination angle $\theta$ as viewed from the vertical direction. The particles constituting the particle stream 22 have extremely little mass, so that the particle stream runs along a locus of the laminar air flow. Hence, when the stream generator 21 discharges particles in the vertical laminar air flow, the inclination angle of the particle stream 22 as viewed from the vertical direction coincides with the inclination angle $\theta$ of the laminar air flow.

Figure 3A:
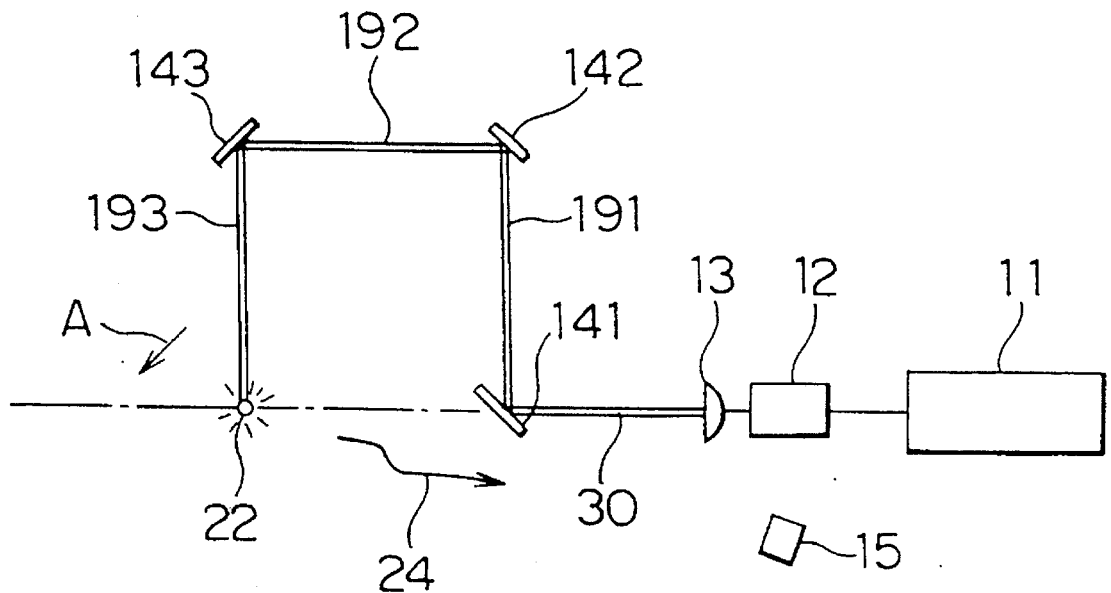
FIG. 3A is an explanatory plan view for showing the apparatus of FIG. 2 at a first operational stage thereof.

Referring to FIG. 3A, there is shown the apparatus of FIG. 2 at the first operational stage thereof in which the first plane mirror 141 is located at its first position reflecting the rectangular laser beam 30 by a right angle. As shown in FIG. 3A, the laser beam travels in the paths 191, 192 and 193 while being reflected by the three plane mirrors 141, 142 and 143. The laminar air flow runs almost in vertical direction and deviated from the vertical direction in a horizontal direction as shown by the arrow A. Namely, the arrow A shows the horizontal component of the vector of the particle stream 22 tracing the laminar air flow. When the particle stream 22 is irradiated by the laser beam 30 in the vicinity of the virtual cross point 20, the particle stream 22 scatters the laser beam 30 to generate scattered lights 24, a portion of which is detected by the photodetector 15.

Figure 3B:
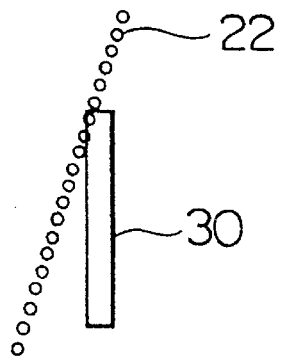
FIG. 3B is an elevational view showing schematically the particle stream and the rectangular light at the first operational stage.

Referring to FIG. 3B, there is shown an elevational view in the vicinity of the virtual cross point 20 where the particle stream 22 and the rectangular laser beam 30 are viewed in the direction of the laser path 193 from the bottom of FIG. 2. The particle stream 22 crosses the rectangular laser beam 30 at the upper portion of the radiant area thereof and in a direction deviated from the vertical direction. After the first operational stage shown in FIG. 3A, the platform 16 (FIG. 2) mounting the optical system is rotated parallel to the virtual plane around the axis passing the virtual cross point 20.

Figure 4A:
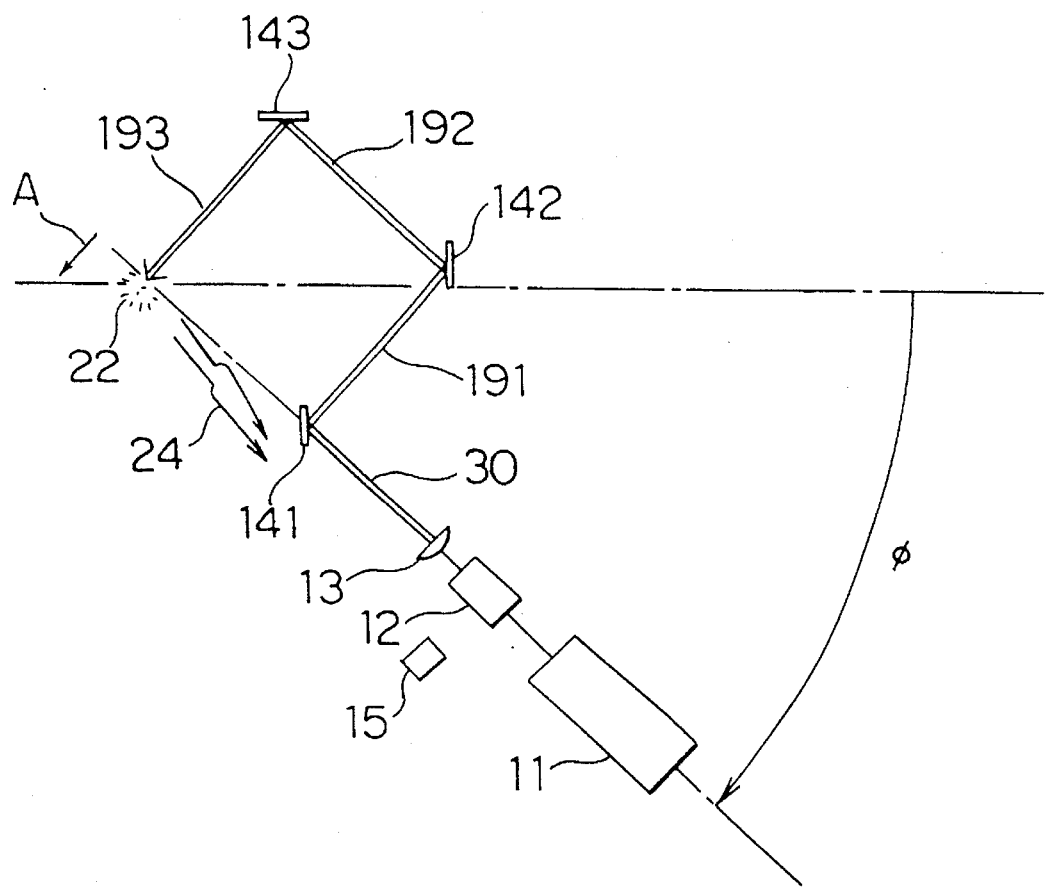
FIG. 4A is another explanatory plan view for showing the apparatus of FIG. 2 at a second operational stage thereof.
Figure 4B:
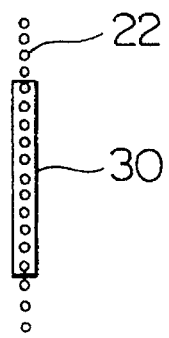
FIG. 4B is another elevational view showing schematically the particle stream and the rectangular light at the second operational stage.

Referring to FIG. 4A showing a second operational stage of the apparatus of FIG. 2, the direction of the path 193 coincides with the direction of the arrow A after the rotation of the platform by an angle $\phi$, so that the scattered light 24 as detected by the photodetector 15 becomes at a maximum. Namely, the rotation of the platform is stopped at the rotational angle $\phi$ where the output of the photodetector 15 is at a maximum during the rotation. FIG. 4B shows the elevation of the particle stream 22 and the rectangular laser beam 30 in the vicinity of the virtual cross point 20 as viewed in the direction of the path 193 at this stage. The particle stream 22 runs through the rectangular radiant area of the laser beam 30 along the longer, vertical sides of the laser beam 30, thereby generating scattered light at a maximum.

Referring to FIG. 5A showing the third operational stage of the apparatus of FIG. 2, the first plane mirror 141 is shifted upward into the upper, second position thereof, so that the rectangular laser beam 30 passing the cylindrical lens 13 travels straight ahead along the path 194 toward the virtual cross point 20. FIG. 5B shows the laser beam 30 and the particle stream 22, in which the laser beam 30 is depicted by dotted lines at this stage. The table 17 is moved or slid in a direction of an arrow normal to the axis 18 of the laser beam in FIG. 5A so that the laser beam 30 is shifted from the location depicted by the dotted lines to another location depicted by solid lines in FIG. 5B. The table 17 is stopped when the output of the detector 15 is at a maximum. In FIG. 5B, there is shown that the particle stream 22 crosses the radiant area of the rectangular laser beam 30 depicted by the solid lines at the center of the radiant area and at an inclination angle θ which is equal to the inclination angle or deviation angle of the laminar air flow as viewed from a vertical line.

Figure 6A:
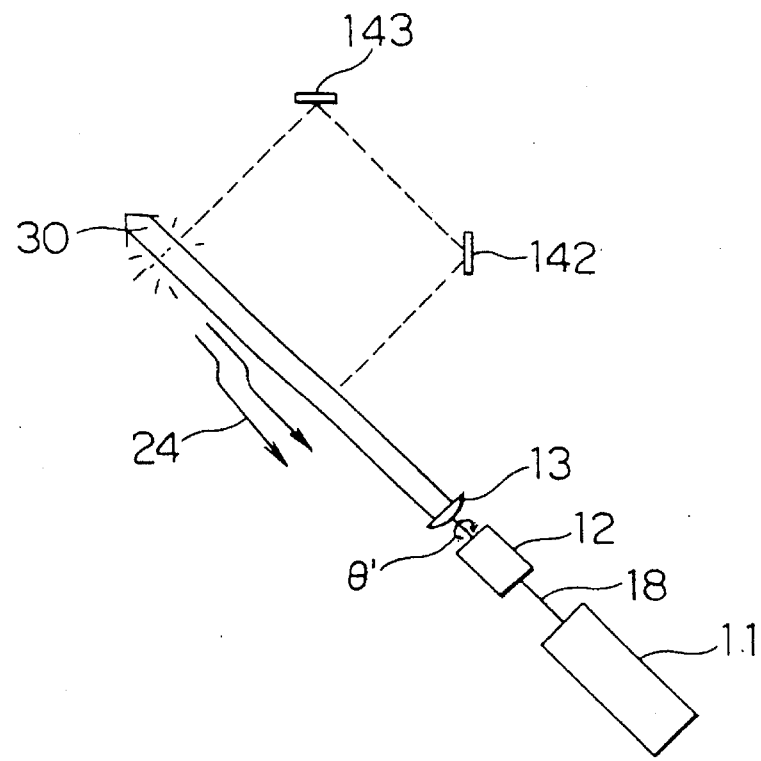
FIG. 6A is a still another explanatory plan view for showing the apparatus of FIG. 2 at a fourth operational stage thereof.
Figure 6B:
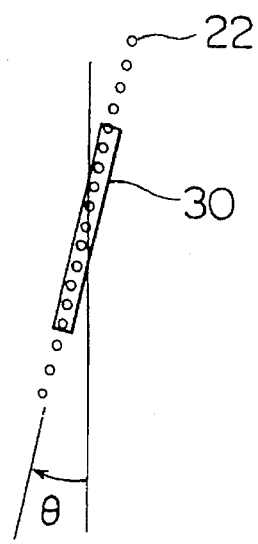
FIG. 6B is a still another elevational view showing schematically the particle stream and the rectangular light at the fourth operational stage.

Subsequently, as shown in FIG. 6A showing the fourth operational stage of the apparatus of FIG. 2, the cylindrical lens 13 is rotated around the axis of the laser beam 30 by an angle θ' until the output of the photodetector becomes at a maximum. Referring to FIG. 6B showing the particle stream 22 and the laser beam 30 at this stage of stopping, the particle stream 22 flows through the rectangular radiant area of the laser beam 30 along the longer sides thereof, which has been rotated by an angle θ' in FIG. 6A. The inclination angle θ of the laminar air flow is detected by the photodetector 15, because, as shown in FIG. 6B, the number of the particle in the particle stream irradiated by the rectangular laser beam 30 is at a maximum when θ' coincides with θ. Hence, the rotational angle θ' of the cylindrical lens 13 is output by the apparatus of the embodiment as a measured inclination angle θ of the laminar air flow in the clean room.

Figure 7:
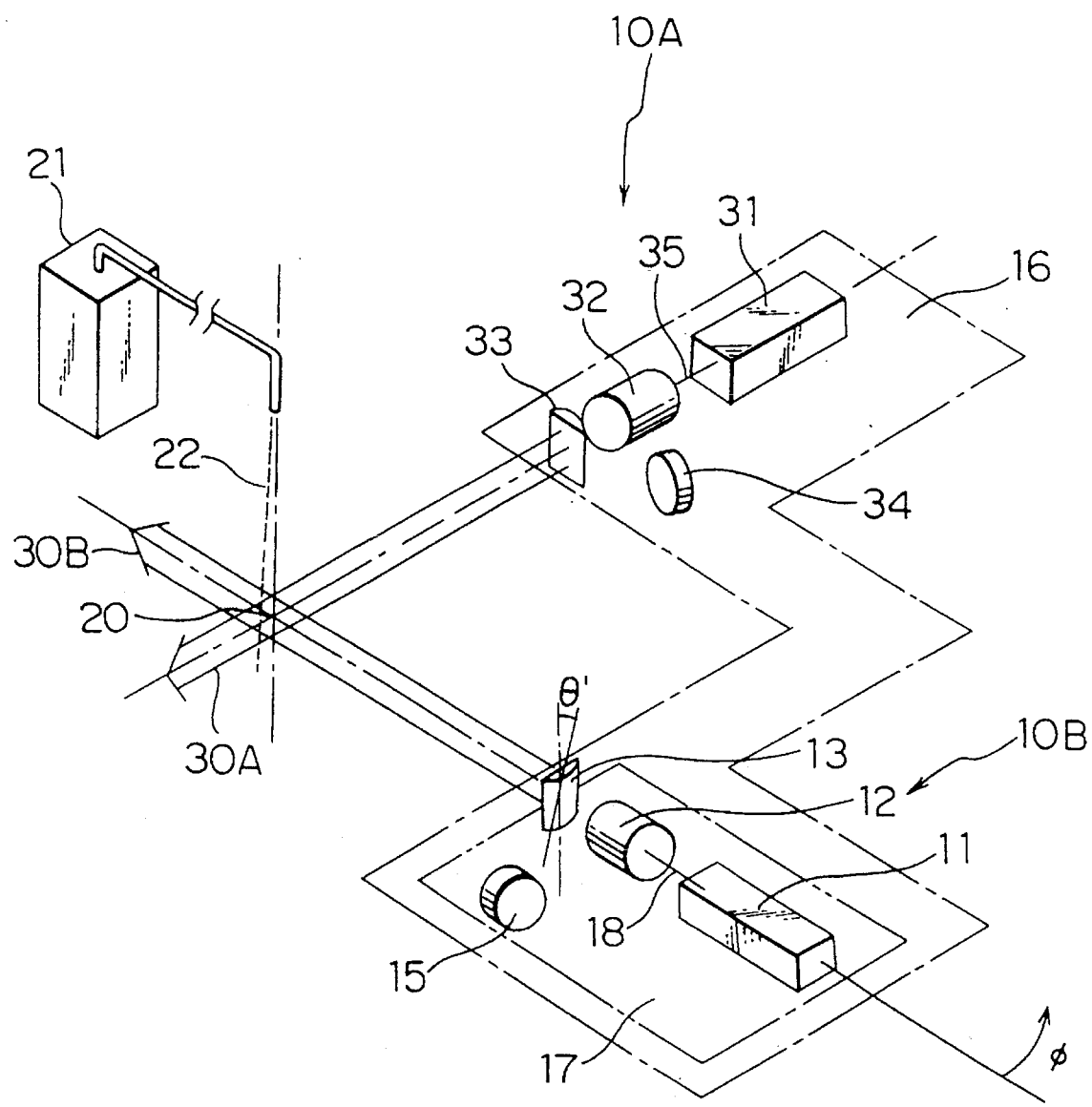
FIG. 7 is a schematic perspective view showing another apparatus for measuring a direction of an air flow according to a second embodiment of the present invention.

Referring to FIG. 7, there is shown another apparatus for measuring a direction of an air flow according to a second embodiment of the present invention. In this drawing, similar elements are designated by the same or similar reference numerals as those in FIG. 2. In the second embodiment, two sets of optical system 10A and 10B are provided on a common platform 16 for detecting a direction of a particle stream 22 generated by a particle generator 21.

Each of the first and the second optical systems 10A and 10B includes an laser oscillator 31, 11, a primary lens set 32, 12 including a collimator lens, a cylindrical lens 33, 13 and a photodetector 34, 15. The optical axes 35 and 18 of both the optical systems 10A and 10B cross at right angles at a position also called a virtual cross point 20.

A plane in which both the axes 35 and 18 of the laser beams 30A and 30B lie is also called a virtual plane as in the first embodiment. The platform 16 is rotatable parallel to the virtual plane around an axis passing through the virtual cross point 20. The second optical system 10B including the laser oscillator 11, the primary lens set 12, the cylindrical lens 13 and the photodetector 15 is mounted on a slide table 17 which is mounted on the platform 16 slidably in the direction normal to the axis 18 of the second optical system 10B. The cylindrical lens 13 of the second optical system 10B is rotatable around the axis 18 of the second optical system 10B.

In operation, the laser oscillator 31 of the first optical system 10A is turned on to thereby generate a laser beam, which is passed through the primary lens set 32 and the cylindrical lens 33 to generate a first rectangular laser beam 30A. The particle stream 22 are irradiated by the first rectangular laser beam 30A, which is scattered by the particles in the particle stream 22 and detected by the photodetector 34 of the first optical system 10A.

The platform 16 is rotated around an axis passing through the virtual cross point 20 and in parallel to the virtual plane, then stopped at a rotational angle φ where the output of the photodetector 34 is at a maximum. With this rotational angle φ, the direction of the axis 35 of the laser beam 30A coincides with the direction of the horizontal component of the vector of the particle stream 22.

Next, with the platform 16 retained at this rotational angle φ, the laser oscillator 31 is turned off and the second laser oscillator 11 is turned on to thereby irradiate the particle stream by a second laser beam 30B. Then, the slide table 17 is moved in the direction normal to the axis 18 of the second optical system 10B so that the output of the photodetector 15 becomes at a maximum. In this stage, the particle stream runs through the radiant area of the second rectangular laser beam 30B in the vicinity of the center thereof.

Next, the cylindrical lens 13 is rotated around the axis 18 and stopped when the output of the photodetector 15 is at a maximum. At this stage, the particle stream runs through the radiant area of the second rectangular laser beam 30B along the longer sides of the radiant area, thereby generating the scattered light at a maximum. The rotational angle θ' of the cylindrical lens 13 is detected and output as a measured inclination angle θ of the laminar air flow.

With the second embodiment, by providing two sets of optical system, the length of the optical path of the laser beam is reduced, hence the loss of the laser beam can be also reduced. One of the photodetectors may be omitted in the second embodiment.

Since above embodiments are described only for examples, the present invention is not limited to such embodiments and it will be obvious for those skilled in the art that various modifications or alterations can be easily made based on the above embodiments within the scope of the present invention.

What is claimed is:

1. A method for measuring a direction of an air flow including the steps of: generating a particle stream having a substantially uniform grain size along the particle stream for tracing an air flow; irradiating the particle stream by a horizontal light beam traveling along a first axis; rotating the light beam around at least one of the first axis and a second vertical axis normal to the first axis and passing in the vicinity of the particle stream; detecting a rotational angle around the second axis for providing a maximum amount of scattering of the light beam effected by the particle stream; and determining the direction of the particle stream based on the detected rotational angle.

2. A method for measuring a direction of an air flow including the steps of: discharging particles in an air flow to generate a particle stream having a grain size substantially uniform along the particle stream; irradiating the particle stream in a first vertical direction by a first light beam illuminating a first rectangular radiant area; rotating the first light beam in a first plane parallel to the first vertical direction around a first axis passing in the vicinity of the particle stream while irradiating the particle stream by the first light beam; stopping the rotating when an amount of the first light beam scattered by the particle stream is at a maximum during the rotation of the first light beam; radiating a second light beam illuminating a second rectangular radiant area along a second horizontal axis in a direction parallel to the first plane and substantially normal to the first light beam after the stopping of the rotation thereof; moving the second light beam in a direction parallel to the first plane and substantially normal to the second light beam and stopping the moving of the second light beam when an amount of the second light beam scattered by the particle stream is at a maximum; rotating the second light beam around a second vertical axis and stopping the rotating of the second light beam when an amount of the second light beam scattered by the particle stream is at a maximum during the rotating of the second light beam; and measuring a rotation angle effected by the rotating of the second light beam.

3. An apparatus for measuring a direction of an air flow comprising: means for generating a particle stream tracing an air flow and having a grain size substantially uniform along the particle stream; means for radiating a rectangular light having a rectangular radiant area along a first axis; first guide means for guiding the rectangular light to irradiate the particle stream in a first direction; a second guide means for guiding the rectangular light to irradiate the particle stream in a second direction normal to the first direction; means for rotating the rectangular light around the first axis; means for selecting one of said first and said second guide means to irradiate the particle stream; and means for measuring an amount of a scattered light generated from the rectangular light when the rectangular light guided by either of the first and the second guide means is scattered by the particle stream.

4. An apparatus for measuring a direction of an air flow as defined in claim 3 further comprising means for rotating said first and the second guide means in unison parallel to the first plane.

5. An apparatus for measuring a direction of an air flow as defined in claim 3 wherein the rectangular light has sides normal to the first plane and longer than the sides parallel to the first plane.

6. An apparatus for measuring a direction of an air flow comprising: means for generating a particle stream tracing an air flow and having a grain size substantially uniform along the particle stream; first radiation means for radiating a first light beam irradiating the particle stream in a first direction; second radiation means for radiating a second light beam along a second direction for rotation around a vertical axis, the second direction being normal to the first direction; and means for measuring an amount of scattered light generated from either of the first and the second light beams when the first or the second light beam is scattered by the particle stream.

7. An apparatus for measuring a direction of an air flow as defined in claim 6 further comprising means for rotating said first and the second radiation means in unison parallel to a plane defined by the first and the second direction.

8. An apparatus for measuring a direction of an air flow as defined in claim 6 wherein each of the first and the second light beams has a rectangular radiant area as viewed in an axis of the first or the second light beam.

* * * * *